United States Patent [19]

Bengelink et al.

[11] Patent Number: 4,489,905

[45] Date of Patent: Dec. 25, 1984

[54] NACELLE-PYLON CONFIGURATION FOR AN AIRCRAFT AND METHOD OF USING THE SAME

[75] Inventors: Ronald L. Bengelink, Renton; Robert H. Wickemeyer, Redmond, both of Wash.

[73] Assignee: The Boeing Company, Seattle, Wash.

[21] Appl. No.: 307,286

[22] Filed: Sep. 30, 1981

[51] Int. Cl.³ .............................................. B64D 29/02
[52] U.S. Cl. .................................. 244/130; 244/199; 244/53 R
[58] Field of Search ................. 244/199, 53 R, 54, 55, 244/130

[56] References Cited

U.S. PATENT DOCUMENTS

| | | | |
|---|---|---|---|
| 2,650,752 | 9/1953 | Hoadley | 244/199 |
| 3,063,661 | 11/1962 | Smith | 244/54 |
| 3,831,888 | 8/1974 | Baker et al. | 244/54 |
| 3,968,946 | 7/1976 | Cole | 244/130 |
| 4,043,522 | 8/1977 | Vetter | 244/54 |
| 4,314,681 | 2/1982 | Kutney | 244/130 |
| 4,334,658 | 6/1982 | Mackenzie | 244/199 |

Primary Examiner—Galen L. Barefoot
Attorney, Agent, or Firm—Hughes, Barnard & Cassidy

[57] ABSTRACT

A below-wing engine nacelle mounted by a pylon forwardly of a wing having a rearward sweep. The pylon upper outboard edge that extends forwardly of the wing is formed with a relatively sharp radius of curvature. Thus, airflow which flows over the top of the pylon in an outboard direction separates over the sharp pylon edge to form a vortex which passes beneath the wing adjacent the outboard surface of the pylon. This vortex maintains attached flow at the outboard pylon surface immediately beneath the wing to reduce drag.

9 Claims, 12 Drawing Figures

NACELLE-PYLON CONFIGURATION FOR AN AIRCRAFT AND METHOD OF USING THE SAME

DESCRIPTION

1. Technical Field

The present invention relates to method and apparatus adapted for reducing drag in the airflow over the top forward surface of a pylon and thence beneath the wing of an aircraft.

2. Background Art

Quite often, to reduce aerodynamic drag, the engine and its nacelle are positioned below the level of the chord of the wing and extend quite far forward of the wing leading edge. The pylon by which the nacelle is mounted to the wing also extends quite far forward of the wing leading edge. Typically, drag minimization requires that the top of the pylon intersect the wing below the leading edge of the wing, rather than extend over the wing upper surface.

With a swept wing configuration, the resulting flow over the top surface of the pylon forward of the wing leading edge (and also some of the flow from the inboard side of the pylon) is rearwardly and in a lateral direction over the top side of the pylon toward the outboard side of the pylon and thence beneath the wing. The severity of this "cross flow" increases as the flow over the top surface of the pylon gets closer to the wing leading edge.

To reduce aerodynamic drag resulting from this "cross flow", a typical solution is to make the upper edge portions of the pylon rounded as much as possible to allow the airflow to follow a fairly gentle curved path from the top of the outboard side of the pylon and thence beneath the wing. There are two problems with this approach. First of all, the constraints of the pylon structure usually do not allow sufficient rounding of the outboard "shoulder" to attain the desired aerodynamic curvature. Secondly, the requirement for rounding is most critical near the wing leading edge, very close to the wing lower surface. At this point, the intersection between the vertical side of the pylon and a relatively horizontal wing lower surface is approaching a sharp corner rather than a rounded shape desired just upstream. Therefore, the intersection itself hinders the attainment of the aerodynamic lines desired. As a result, there is a tendency of the flow along the outboard wing pylon intersection to proceed aft from the wing leading edge in an aerodynamically rather confused pattern. More specifically, the flow from the top of the pylon moves far down the outboard side of the pylon leaving an area of slow, low energy, turbulent air in the intersection region. This results in high drag for this area and local vibration due to turbulence and separation.

A search of the patent literature has not disclosed any patents having a teaching which the applicants believe to be particularly relevant to this particular problem. However, the following patents are noted as being of general interest. These are as follows:

U.S. Pat. No. 2,090,775, Wright, shows an aircraft where struts are connected from the fuselage downwardly and outwardly to the wing. The aerodynamic contour of the struts is varied along its length to match the airflow at different locations.

U.S. Pat. No. 3,101,920, Fradenburgh, shows a helicopter having a pylon on top of the fuselage, with the rotor being mounted to the pylon. Boundary layer air is blown outwardly through slots in the member by which the rotor head is mounted to the pylon.

U.S. Pat. No. 3,370,810, Shevell et al., shows a device to alleviate the problems of premature stall at the wing tips. This comprises a member positioned beneath the wing and extending moderately forwardly of the wing. The nose of the device extends forward of the wing leading edge sufficiently to intersect the air stagnation streamline near aircraft stall. Thus, there is created a vortex which begins at the leading edge of the device and travels upwardly over the wing.

U.S. Pat. No. 3,471,107, Ornberg, discloses various vortex generating devices to create vortices over the top of a delta wing.

In U.S. Pat. No. 3,744,745, Kerker et al, a pair of lifting vanes are attached to the upper forward side surfaces of an engine nacelle. These two vanes produce a downwash to alleviate the condition of a strong upwash which otherwise would flow upwardly around the nacelle and over the wing to cause separation of the flow over the wing. The downwash field is bordered on each side by two vortices.

In U.S. Pat. No. 3,960,345, Lippert, Jr., a pair of strakes are mounted on the top side of an engine nacelle to reduce or prevent the formation of vortices usually occurring with nacelle-wing combinations.

In U.S. Pat. No. 3,968,946, Cole, there is shown an extendable fairing for use between an engine nacelle and the aircraft wing. When the leading edge slat of the wing is extended, the extendable fairing is moved outwardly to fill the gap between a fixed fairing section on the nacelle and the leading edge flap.

U.S. Pat. No. 4,176,813, Headley et al, discloses a nose for an aircraft having a particular configuration to optimize vortex patterns over the aircraft nose.

In British patent specification No. 523,357, there is a shield-like member positioned between the wing and a propulsion unit having a propeller. This is to provide a separation of the normal airflow under the wing from the slipstream produced by the propeller.

Therefore, it is an object of the present invention to provide for an apparatus and method to alleviate the problem of drag in the nacelle/pylon configuration described above, and also to accomplish this in a relatively simple and effective manner.

DISCLOSURE OF THE INVENTION

The present invention is adapted to be utilized in an aircraft having:

a. a swept wing which has a first end and a second end, a leading edge, a trailing edge, an upper aerodynamic surface and a lower aerodynamic surface, said wing slanting rearwardly from said first end to said second end, b. a nacelle positioned at a level below said wing, at least a portion of said nacelle being located forwardly of the wing leading edge, c. a pylon by which said nacelle is mounted to the wing, said pylon having a forward pylon portion extending forwardly of the wing leading edge and a rear pylon portion positioned beneath the lower surface of the wing, said forward pylon portion having a first side forward surface portion positioned closer to the wing first end, and a second side forward surface portion positioned closer to the wing second end, and a top forward surface portion extending between the first and second forward side surface portions, said rear pylon portion having a first rear side surface portion located closer to the first wing end and a second rear side surface portion located closer to the wing second, and d. said wing, nacelle and pylon being arranged relative to one another so that airflow over the top forward surface portion of the pylon follows a direction of rearward sweep of the wing laterally to pass beneath the wing lower surface adjacent the second rear side surface portion.

The improvement of the present invention comprises means to create a vortex in the airflow that passes over the top forward surface portion in a manner that the vortex travels along an area adjacent the wing lower surface and adjacent the second rear side surface portion. The vortex is sufficiently strong to maintain attached flow in that area.

In the particular embodiment shown herein, this is accomplished by having the top forward surface portion and the forward second side surface portion shaped to meet one another along a forward upper edge surface portion having a lengthwise axis. The forward upper edge surface portion has a sufficiently small radius of curvature in sectional planes taken perpendicular to the lengthwise axis to cause airflow over said forward upper edge surface portion to separate and create the vortex in the airflow.

In the preferred embodiment shown herein, the radius of curvature decreases along the lengthwise axis of the pylon in a rearward direction. Also, the second forward side surface portion extends downwardly at a slant moderately towards said first side surface portion.

Also, as a further specific improvement, the first side forward surface portion and the top forward surface portion are shaped to meet one another along a second forward upper edge surface portion having a lengthwise axis. The second forward upper edge portion extends a sufficient distance upwardly adjacent the wing leading edge to form a seal with an extended leading edge slat of the wing to improve aerodynamic flow over the slat and the pylon.

In the method of the present invention, a vortex is created as described above, and desirably the vortex is created by passing the airflow over the top upper surface portion over the relatively sharp forward upper edge surface portion which is nearer the second end of the wing.

Other features will become apparent from the following detailed description.

BEST MODE FOR CARRYING OUT THE INVENTION

Figure 1:
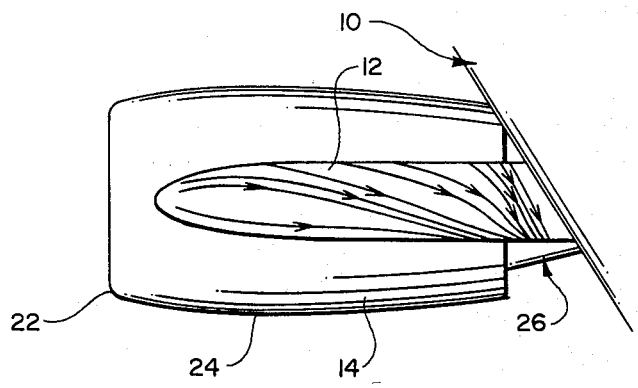
FIG. 1 is a top plan view of a typical prior art pylon for a below wing forward mounted engine nacelle, showing that portion of the pylon extending forwardly from the wing leading edge, and also indicating a typical flow pattern over the top surface of the pylon.
Figure 2:
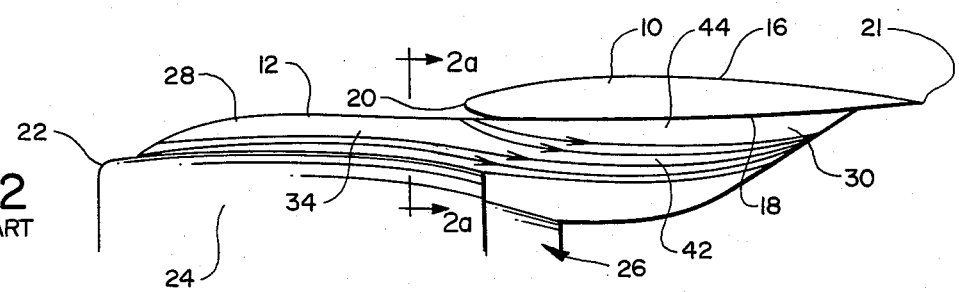
FIG. 2 is a side elevational view of the outboard side of the prior art pylon and engine nacelle shown in FIG. 1, further illustrating the flow pattern along the side of the pylon and beneath the wing.

It is believed that a clear understanding of the present invention will be obtained by first describing a conventional prior art nacelle/pylon configuration for an engine nacelle mounted beneath and forwardly of the wing. Such a prior art nacelle/pylon configuration is shown in FIGS. 1 and 2, where there is a wing 10, pylon 12 and engine nacelle 14. For convenience of illustration, only a portion of the engine nacelle 14 and wing 10 are shown. The wing 10 sweeps rearwardly from the inboard end to the outboard end and has an upper surface 16, a lower surface 18, a leading edge 20 and a trailing edge 21.

The engine nacelle 14 is or may be of conventional configuration, and as shown herein is moderately elongate, with a generally circular configuration in transverse section. The lengthwise contours of the nacelle 14 are moderately rounded so that the cross sectional area from the nacelle inlet 22 expands moderately to the middle section 24 of the nacelle and again converges radially inwardly at the rear exhaust end 26.

The pylon 12 can be considered as having two portions, namely a forward portion 28 extending forwardly of the wing leading edge 20, and a rear portion 30 positioned below the wing lower surface 18 and rearwardly of the wing leading edge 20. Also, as shown herein, the rear end 26 of the engine nacelle 14 terminates just a short distance behind the wing leading edge 20, and the major part of the rear portion 30 of the pylon 12 is located rearwardly of the exhaust end 26 of the nacelle 14.

Figure 2A:
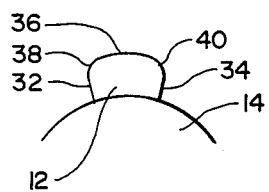
FIG. 2A is a sectional view taken along line 2A—2A of FIG. 2.

The lengthwise axis of the pylon 12 extends generally parallel to the center axis of the engine contained in the nacelle 14 and also generally parallel to the chordwise axis of the wing 10. The cross sectional configuration of the pylon 12 a short distance forward of the wing leading edge 20 is shown in FIG. 2A. The pylon 12 can be considered as having a first inboard side surface portion 32, a second outboard side surface portion 34, and a top surface portion 36.

The two side surface portions 32 and 34 are generally vertically aligned, and the top surface 36 is generally horizontally aligned. The forward ends of these surface portions 32, 34 and 36 converge at the forward end of the pylon 12 to blend aerodynamically into the top forward surface of the nacelle 14. The inboard side surface portion 32 and the top surface portion 36 meet one another at an upper inboard edge surface portion 38, and in like manner the outboard side surface portion 34 and the top surface portion 36 meet one another along an upper outboard edge surface portion 40.

Since the wing 10 sweeps rearwardly in an outboard direction, the typical flow streamlines over the pylon forward top surface portion are, as shown in FIG. 1, slanted in an outboard direction. It is apparent that the outboard or lateral component of flow increases substantially as the flow over the pylon upper surface gets closer to the wing leading edge 20. As indicated previously, the typical prior art approach has been to round the upper edge surface portions 38 and 40 as much as possible to allow the airflow a fairly gentle curved path across the top surface portion 36 of the pylon 12. The effect of this rounded configuration will now be discussed further with reference to FIG. 2, which shows the streamlines of flow along the side of the outboard side surface portion 34 of the forward pylon portion and along the outboard side surface portion 42 of the rear portion 30 of the pylon 12. It can be seen that the streamlines which pass over the top surface portion 36 just forward of the wing leading edge 20 tend to continue to flow at a moderate downward slant rearwardly away from the lower surface 18 of the wing 10. The result of this is that at the area 44 where the vertical side outboard surface portion 42 of the pylon meets the lower surface 18 of the wing 10 there is created an area of slow, low energy, turbulent air, which, as indicated previously, results in high drag for this area and local vibration due to turbulence and separation.

It is to be understood that the immediately preceding discussion is directed to a typical prior art configuration to illustrate the problems associated therewith. With the foregoing in mind, the present invention will now be described.

Since the major components and the general configuration of the present invention have substantial similarities to the prior art configuration described above, components of the present invention will be given numerical designations the same as corresponding components of the prior art configuration, with an "a" suffixed distinguishing those of the present invention. Accordingly, in the present invention, there is a wing 10a, pylon 12a and engine nacelle 14a. The wing 10a and engine nacelle 14a are, or may be, substantially the same as the corresponding wing 10 and engine nacelle 14 of the prior art configuration described above. Thus, no further description of the wing 10a and nacelle 14a will be given, and the same numerical designations as in the prior art configuration will simply be applied in place of any further description. Thus, the wing 10a has an upper surface 16a, lower surface 18a, etc.

The surface configuration of the pylon 12 is critical in the present invention. For purposes of description, the pylon 12a is considered as having a forward portion 28a, rear portion 30a, first inboard side surface portion 32a, second outboard side surface portion 34a, top surface portion 36a, upper inboard edge surface portion 38a, upper outboard edge surface portion 40a and rear outboard side surface portion 42a.

Attention is now directed to FIGS. 5A through 5G to describe the configuration of the pylon 12a. As indicated previously, the cross sectional configuration of the pylon 12a of the present invention is shown in solid lines in FIGS. 5A through 5F, while those of the conventional prior art pylon 12 are shown in broken lines. It can be seen that in the present invention the upper edge surface portions 38a and 40a are both made relatively sharp in comparison with the prior art configuration. The configuration of the upper outboard edge surface portion 40a is believed to more critical in the present invention, so the configuration of the inboard edge portion 38a will be discussed first rather briefly. The inboard edge portion 38a increases in sharpness in a rearward direction along the lengthwise axis of the pylon 12 and is raised moderately at the location where it approaches closely to the wing leading edge 20a. The reason for this is that when the wing 10a is in its landing configuration and a forward slat is placed outwardly from the wing leading edge 20a, because of the cross sectional configuration shown in FIG. 5F, the inboard side surface portion 32 makes a seal with the slat to improve aerodynamic flow in that area. This is not closely relevant to the present invention since the present invention is designed primarily to reduce drag in the cruise configuration of the wing 10a. However, a discussion of this feature is included to insure that there is a complete disclosure of the preferred embodiment. As will be explained below, the relatively sharp curve of the outboard edge surface portion 40a serves a distinctly different purpose.

Figure 3:
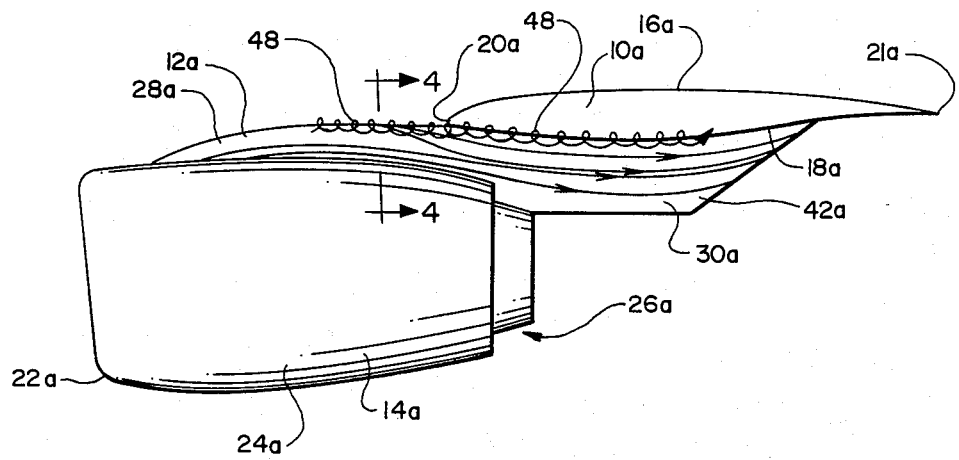
FIG. 3 is a side elevational view, similar to FIG. 2, but showing the present invention, and also indicating the flow pattern over the pylon and beneath the wing.
Figure 4:
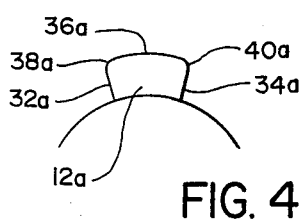
FIG. 4 is a sectional view taken along line 4—4 of FIG. 3.
Figure 5A:
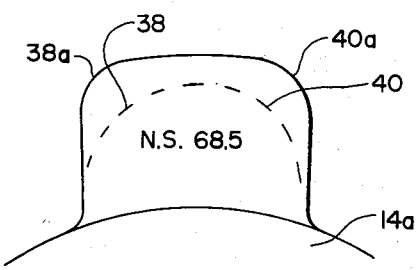
FIGS. 5A through 5F are six sectional views showing in full lines the cross sectional configuration of the pylon of the present invention at the stations indicated in FIG. 5G, with FIG. 5G being a side elevational view of the forward portion of the pylon, and also with FIGS. 5A through 5F showing in broken lines the cross sectional configuration of the typical prior art pylon shown in FIGS. 1 and 2.
Figure 5B:
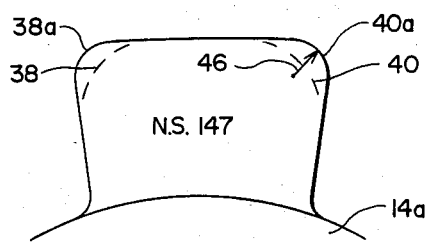
Figure 5C:
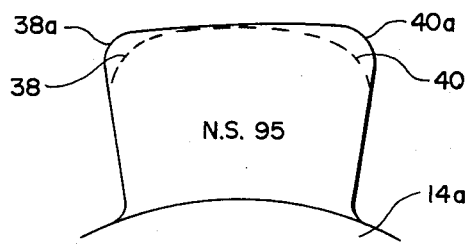
Figure 5D:
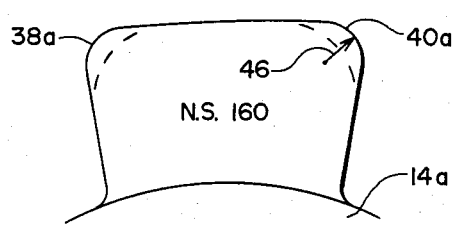
Figure 5E:
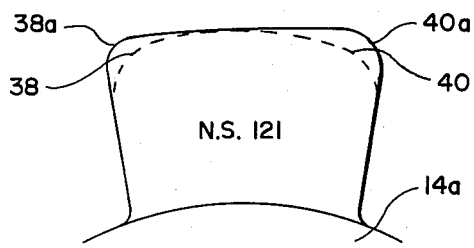
Figure 5F:
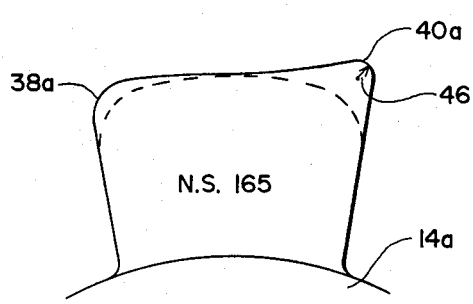
Figure 5G:
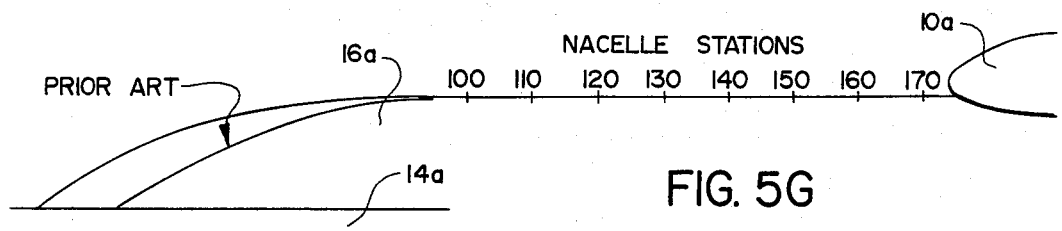

With regard to the upper outboard edge surface portion 40a, the radius of curvature, indicated at 46 is made sufficiently small so that the airflow over the pylon top surface 36a is not able to remain attached at the edge surface portion 40a. Thus, as the airflow passes over the edge surface 40a, it separates from it, rolling into a discrete vortex which trails back along the edge surface portion 40a and beneath the wing 10a adjacent the rear outboard pylon surface portion 42a in the area 44a. This vortex is indicated at 48 in FIG. 3. The effect of this vortex 48 is to induce free stream air into this area 44a and therefore maintain clean, attached flow back to the pylon trailing edge 50a.

The strength of the vortex is a function of the length of the sharp outboard edge surface portion 40a and the sharpness of this edge. In applying the present invention to any particular aircraft design, this sharpness must be tailored carefully through wind tunnel testing to produce a vortex strong enough to maintain the attached flow, and yet not strong enough to cause periodic vibration on local skin panels. Since this is well within the skill already present in the prior art, no further discussion of that subject will be included herein. In the present configuration, as can be seen in FIGS. 5A–5F, the sharpness of edge 40a increases in a rearward direction toward the leading edge 20a of the wing 10a.

To give approximate values mathematically of the degree of sharpness of the upper outboard edge surface portion 40a, the following formula is given:

$$\frac{R_{corner}}{W_{max}} \leq 0.15 \text{ and } \frac{L_{effective}}{W_{max}} \leq 1.0$$

where
$L_{effective}$ is the length over which $$\frac{R_{corner}}{W_{max}} \leq .15$$

$R_{corner}$ equals the radius of curvature of the upper outboard edge surface portion
$W_{max}$ equals the maximum width of the pylon.

It is to be understood that while the above formula is believed to be a reasonable approximation for many situations, for any particular application wind tunnel experimentation should be carried out to optimize the design and possibly arrive at suitable configurations beyond the limits of the above formula.

Also, it should be understood that the present invention has been described relative to a wing configuration having a rearward sweep in an outboard direction. Obviously, if the wing had a forward sweep in an outboard direction, the same teachings would apply, but the arrangement of the parts would simply be reversed.

Wind tunnel testing has confirmed that the present invention, in comparison with the prior art configuration disclosed herein has provided a reduction in cruise drag of approximately one-half percent to two-thirds percent for a particular airplane configuration.

It is to be understood that while the present invention has been described in reference to a particular application of an engine nacelle, pylon and wing, within the broader aspects of the present invention, it could have broader application. Thus, in the present invention, the terms "nacelle", "wing" and "pylon" are intended to apply as well to components having generally similar aerodynamic functions, and are not intended to apply only to those components having that particular location or function on an aircraft.

Also, it is to be understood that while the preferred embodiment is to provide the relatively sharp edge at the top pylon surface to form the vortex at the desired location, within the broader aspects of the present invention other devices could be used, such as a vortex creating vane or possibly blown air. However, the present embodiment provides particular advantages in terms of cost, simplicity, minimum drag and no power requirements for operation. Obviously, various modifications could be made without departing from the basic teachings of the present invention.

Now therefore we claim:

1. In an aircraft having:
   a. a swept wing which has a first end and a second end, a leading edge, a trailing edge, an upper aerodynamic surface and a lower aerodynamic surface, said wing slanting rearwardly from said first end to said second end,
   b. a nacelle positioned at a level below said wing, at least a portion of said nacelle being located forwardly of the wing leading edge,
   c. a pylon by which said nacelle is mounted to the wing, said pylon having a forward pylon portion extending forwardly of the wing leading edge and a rear pylon portion positioned beneath the lower surface of the wing, said forward pylon portion having a first side forward surface portion positioned closer to the wing first end, a second side forward surface portion positioned closer to the wing second end, and a top forward surface portion extending between the first and second forward side surface portions, said rear pylon portion having a first rear side surface portion located closer to the first wing end and a second rear side surface portion located closer to the wing second end, and
   d. said wing, nacelle and pylon being arranged relative to one another so that airflow over the top forward surface portion of the pylon follows a direction of rearward sweep of the wing laterally to pass beneath the wing lower surface adjacent the second rear side surface portion, an improvement comprising:
   means to create a single discrete vortex at the top forward surface portion in a manner that the vortex travels along an area adjacent the wing lower surface and adjacent the second rear side surface portion, with the vortex being sufficiently strong to maintain attached flow in said area.

2. The improvement as recited in claim 1, wherein the improvement comprises:
   said top forward surface portion and said forward second side surface portion being shaped to meet one another along a forward upper edge surface portion having a lengthwise axis, said forward upper edge surface portion having a sufficiently small radius of curvature in sectional planes taken perpendicular to said lengthwise axis to cause airflow over said forward upper edge surface portion to separate and create said vortex in the airflow.

3. The improvement as recited in claim 2, wherein the radius of curvature decreases along the lengthwise axis of the pylon in a rearward direction.

4. The improvement as recited in claim 3, wherein said second forward side surface portion extends downwardly at a slant moderately toward said first forward side surface portion.

5. The improvement as recited in claim 2, wherein said second forward side surface portion extends downwardly at a slant moderately toward said first forward side surface portion.

6. The improvement as recited in claim 2, wherein the first side forward surface portion and the top forward surface portion are shaped to meet one another along a second forward upper edge portion having a lengthwise axis, said second forward upper edge portion extending a sufficient distance upwardly adjacent the wing leading edge to form a seal with an extended leading edge slat of the wing, to improve aerodynamic flow over said slat and said pylon.

7. The improvement as recited in claim 2, wherein said radius of curvature of the forward upper edge surface portion is sized according to a formula which is:

$$\frac{R_{corner}}{W_{max}} \leq 0.15 \text{ and } \frac{L_{effective}}{W_{max}} \leq 1.0$$

where
$L_{effective}$ is the length over which $$\frac{R_{corner}}{W_{max}} \leq .15$$

$R_{corner}$ equals the radius of curvature of the upper outboard edge surface portion
$W_{max}$ equals the maximum width of the pylon.

8. In an aircraft having:
   a. a swept wing which has a first end and a second end, a leading edge, a trailing edge, an upper aerodynamic surface and a lower aerodynamic surface, said wing slanting rearwardly from said first end to said second end,
   b. a nacelle positioned at a level below said wing, at least a portion of said nacelle being located forwardly of the wing leading edge,
   c. a pylon by which said nacelle is mounted to the wing, said pylon having a forward pylon portion extending forwardly of the wing leading edge and a rear pylon portion positioned beneath the lower surface of the wing, said forward pylon portion having a first side forward surface portion positioned closer to the wing first end, and a second side forward surface portion positioned closer to the wing second end, and a top forward surface portion extending between the first and second forward side surface portions, said rear pylon portion having a first rear side surface portion located closer to the first wing end and a second rear side surface portion located closer to the wing second end, d. said wing, nacelle and pylon being arranged relative to one another so that airflow over the top forward surface portion of the pylon follows a direction of rearward sweep of the wing laterally to pass beneath the wing lower surface adjacent the second rear side surface portion, an improvement comprising a method which is:

creating a vortex at the top forward surface portion in a manner that the single discrete vortex travels along an area adjacent the wing lower surface and adjacent the second rear side surface portion, with the vortex being sufficiently strong to maintain attached flow in said area.

9. The improvement as recited in claim 8, wherein said method is further characterized in that the vortex is created by passing the airflow over the top forward surface portion over a forward upper edge surface portion of a sufficiently small radius of curvature to cause separation of the airflow, with the forward upper edge surface portion being located at a location where the top forward surface portion and the forward second side surface portion join to one another.

* * * * *